US008730973B2

(12) United States Patent
Hu et al.

(10) Patent No.: US 8,730,973 B2
(45) Date of Patent: May 20, 2014

(54) METHOD AND EQUIPMENT FOR USER'S UPLINK DATA SCHEDULING

(75) Inventors: Zhenping Hu, Beijing (CN); Dajie Jiang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 484 days.

(21) Appl. No.: 13/121,368

(22) PCT Filed: Sep. 28, 2009

(86) PCT No.: PCT/CN2009/001101
§ 371 (c)(1),
(2), (4) Date: Mar. 30, 2011

(87) PCT Pub. No.: WO2010/037272
PCT Pub. Date: Apr. 8, 2010

(65) Prior Publication Data
US 2011/0292845 A1    Dec. 1, 2011

(30) Foreign Application Priority Data

Sep. 28, 2008  (CN) .......................... 2008 1 0223287

(51) Int. Cl.
*H04L 12/28*    (2006.01)
(52) U.S. Cl.
USPC ......... 370/395.4; 370/280; 370/442; 370/443
(58) Field of Classification Search
USPC .......... 370/280, 329, 395.4–395.43, 442–443
See application file for complete search history.

(56) References Cited

U.S. PATENT DOCUMENTS

| 6,611,507 | B1 * | 8/2003 | Hottinen et al. | 370/331 |
| 8,160,014 | B2 * | 4/2012 | Ojala et al. | 370/329 |
| 2009/0175159 | A1 * | 7/2009 | Bertrand et al. | 370/203 |
| 2009/0268693 | A1 * | 10/2009 | Lindh et al. | 370/336 |
| 2010/0074209 | A1 * | 3/2010 | Montojo et al. | 370/329 |

FOREIGN PATENT DOCUMENTS

| CN | 101193444 A | 6/2008 |
| CN | 101197615 A | 6/2008 |
| CN | 101272175 A | 9/2008 |

OTHER PUBLICATIONS

CATT, CMCC, and Qualcomm Europe. "Multiple Patterns for UL SPS." 3GPP TSG RAN WG2 #63. R2-084841. Aug. 18-22, 2008.*

* cited by examiner

*Primary Examiner* — Hassan Kizou
*Assistant Examiner* — Ashil Farahmand
(74) *Attorney, Agent, or Firm* — Workman Nydegger (57) ABSTRACT

A method for user uplink data scheduling and an user equipment are applied in multi-period mode semi-persistent scheduling under 3GPP Long Term Evolution TDD configuration 2, the method includes setting the different offsets delta of periods for multi-period mode semi-persistent scheduling started by each uplink sub-frame in 10 ms radio frame, determining the periods of multi-period mode semi-persistent scheduling started by each uplink sub-frame in 10 ms radio frame according to the set delta, and scheduling the uplink new conveyed package data of user according to the periods of multi-period mode semi-persistent scheduling started by each uplink sub-frame in 10 ms radio frame. The method and user equipment can be used to increase the utilization ratio of resource, and are simple and easy to use.

9 Claims, 8 Drawing Sheets

Fig. 1

--Prior Art--

--Prior Art--

METHOD AND EQUIPMENT FOR USER'S UPLINK DATA SCHEDULING

CROSS-REFERENCE TO RELATED APPLICATIONS

The present application is a US National Stage of International Application No. PCT/CN2009/001101, filed 28 Sep. 2009, designating the United States, and claiming priority to Chinese Patent Application No. 200810223287.9 filed 28 Sep. 2008, which is incorporated herein by reference in its entirety.

FIELD OF THE INVENTION

The present invention relates to the field of mobile communications and particularly to a method for scheduling uplink data of a user and a user equipment applicable with 3GPP LTE TDD Configuration 2.

BACKGROUND OF THE INVENTION

Figure 1:
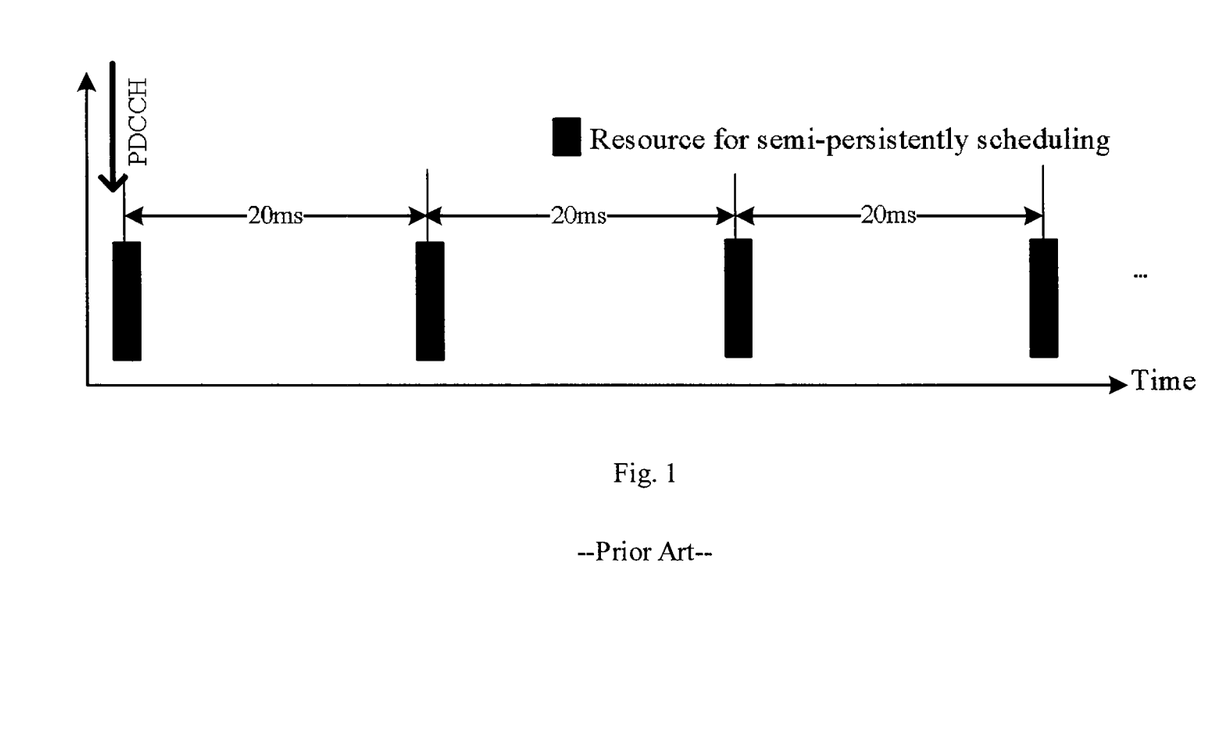
FIG. 1 illustrates a schematic diagram of semi-persistent scheduling in the prior art.

Semi-Persistent Scheduling (SPS) is a new scheduling method proposed in 3G Long Term Evolution (LTE) to save a Physical Downlink Control Channel (PDCCH), and was proposed primarily for a Voice over IP (VoIP) service. A general idea of the SPS lies in that a newly transmitted packet of the VoIP service arrives at an interval of 20 ms, thus a periodicity of reserved resources may be indicated through Radio Resource Control (RRC) signaling, then reserved resources in the time and frequency domains may be activated over a Physical Downlink Control Channel (PDCCH), and subsequently data may be transmitted automatically over resources at a fixed location at the interval of 20 ms without indicating the allocated resources for each newly transmitted packet over the PDCCH; and that resources to be occupied by a retransmitted packet can not be reserved but have to be scheduled dynamically due to unpredictability thereof. In view of this, it is referred to as semi-persistent scheduling as illustrated in FIG. 1.

Figure 2:
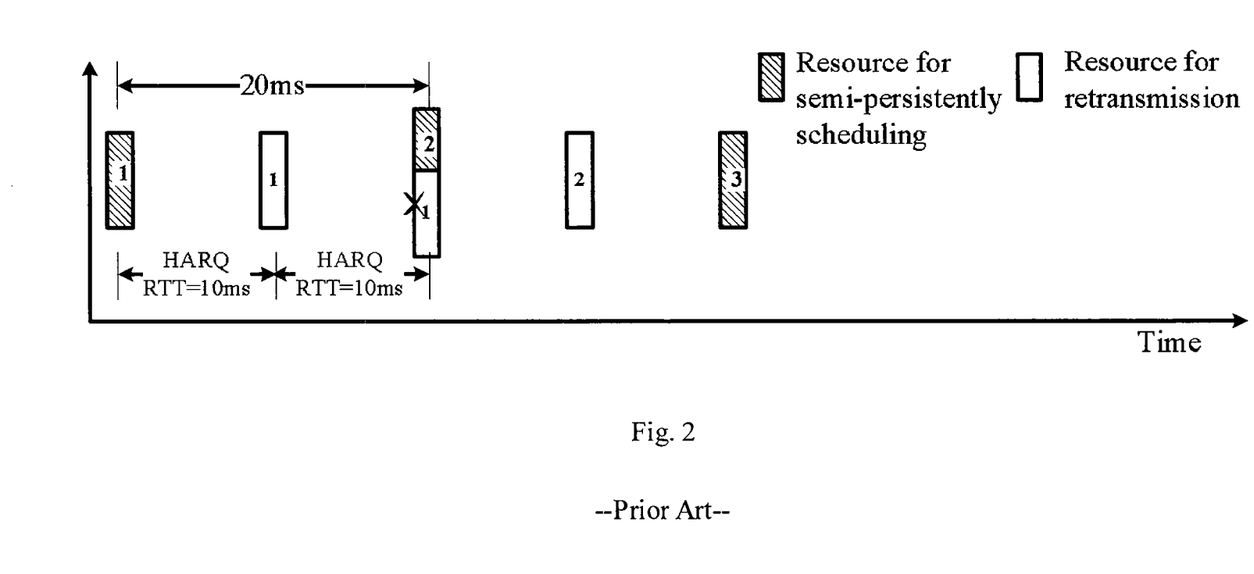
FIG. 2 illustrates a schematic diagram of resource conflict between a retransmitted packet and a newly transmitted packet in TD-LTE semi-persistent scheduling in the prior art.

In an LTE Time Division Duplex (TDD) system, there are seven proportional configurations of uplink and downlink sub-frames, respectively Configurations 0 to 6, for five of which Round Trip Time (RTT) of a Hybrid Automatic Repeat reQuest (HARQ) corresponding to uplink transmission is 10 ms. Since the uplink of TD-LTE (i.e., TDD LTE) is based upon a synchronous non-adaptive HARQ, that is, the same resources are occupied and the same transmission format is adopted for a retransmitted packet as a newly transmitted packet (i.e., an initially transmitted packet) in the case that there is no indication over the PDCCH, the HARQ packet transmitted for the second time may conflict with resource allocation of the semi-persistent scheduling for the newly transmitted packet. As illustrated in FIG. 2, reference numbers 1, 2 and 3 in FIG. 2 represent serial numbers of uplink synchronous HARQ processes respectively (a newly transmitted packet and its retransmitted packet correspond to the same serial number of an HARQ process), and as can be apparent, if both of the uplink HARQ processes 1 and 2 are used to transmit data of the same UE, the same resources will be occupied by a retransmitted packet of the uplink HARQ process 1 and a newly transmitted packet of the uplink HARQ process 2 after elapsing of 20 ms since a newly transmitted packet of the uplink HARQ process 1 is transmitted, thus causing resource confliction.

In order to address the problem of resource confliction between a retransmitted packet and a newly transmitted packet in the TD-LTE semi-persistent scheduling, a solution referred to as semi-persistent scheduling in a multi-periodicity mode has been proposed. A semi-persistent scheduling periodicity (i.e., an interval for resource allocation) applicable to a VoIP service is typically 20 ms, while there are two periodicities for the semi-persistent scheduling in the multi-periodicity mode, i.e., T1 and T2, where T1+T2=40 ms and T1 and T2 are active alternately. The relationship between T1 and T2 may be as follows.

$$T1 = \text{SPS periodicity} + \text{delta} \quad (1)$$

$$T2 = \text{SPS periodicity} - \text{delta} \quad (2)$$

Where the SPS periodicity represents a periodicity of the semi-persistent scheduling, which is 20 ms for the VoIP service, and the delta represents an offset of the periodicity of the semi-persistent scheduling.

As proposed in an existing solution, the value of delta in Equations (1) and (2) may be specified dependent upon a configuration of TD-LTE uplink and downlink sub-frames and a location of an uplink sub-frame at the beginning of semi-persistent scheduling in a TDD periodicity, that is, the value of delta may be determined uniquely when the semi-persistent scheduling starts with a specific uplink sub-frame, and RRC signaling is not necessary for notifying a User Equipment (UE) of the value of delta to be used, while 1-bit RRC signaling is necessary for indicating whether to use the semi-persistent scheduling in the multi-periodicity mode. For example, in the case of TDD Configuration 2, there is one uplink sub-frame in each TDD periodicity of 5 ms, and according to this solution, the value of delta is calculated in the following equation.

$$\text{Delta} = 1 + \text{number of DL sub-frames} \quad (3)$$

Or $$\text{Delta} = -1 - \text{number of DL sub-frames} \quad (4)$$

Where the number of DL sub-frames in Equations (3) and (4) represents the number of downlink sub-frames in a 5 ms TDD periodicity (where a special sub-frame may be regarded as a downlink sub-frame due to transmission of downlink data therein), which is four for the VoIP service in the case of TDD Configuration 2, therefore the value of delta corresponding to any semi-persistent scheduling in the multi-periodicity mode starting with an uplink sub-frame is 5 ms or −5 ms.

Figure 3:
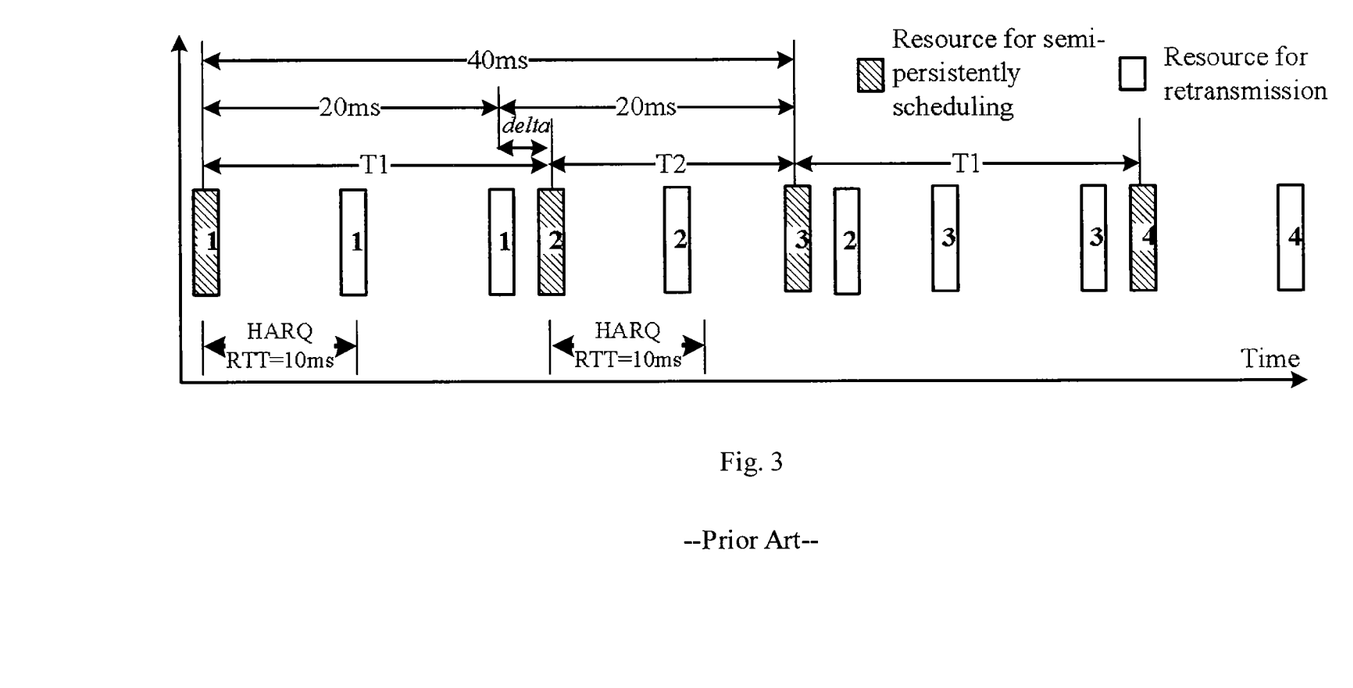
FIG. 3 illustrates a schematic diagram of semi-persistent scheduling in the multi-periodicity mode in the prior art.

FIG. 3 illustrates a schematic diagram of semi-persistent scheduling in the multi-periodicity mode, and 1, 2, 3 and 4 in FIG. 3 represent serial numbers of uplink synchronous HARQ processes of the same UE respectively. As can be apparent, no resource confliction arises between a packet retransmitted for the second time of the process 1 and a newly transmitted packet of the process 2 and between a packet retransmitted for the second time and a newly transmitted packet of other processes.

Figure 4:
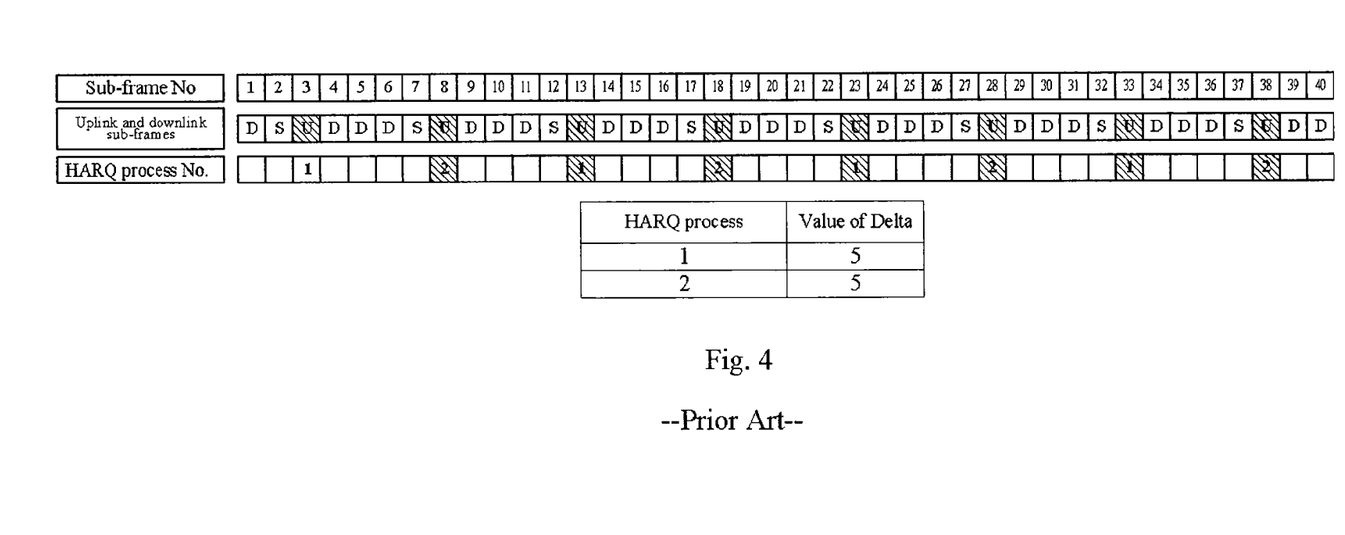
FIG. 4 illustrates a schematic diagram of values of Delta and uplink data resources in the case of TDD Configuration 2 in the prior art.

FIG. 4 illustrates configured values of delta and available resources for HARQ packets in the case of TDD Configuration 2, where both values of delta corresponding to the uplink HARQ processes 1 and 2 are 5, D represents a downlink (DL) sub-frame, U represents an uplink (UL) sub-frame, and S represents a special sub-frame. Both retransmission intervals of the uplink HARQ processes 1 and 2 are 10 ms, then in a 40 ms frame, resources of UL sub-frames 3, 13, 23 and 33 are available to the HARQ process 1 and resources of UL sub-frames 8, 18, 28 and 38 are available to the HARQ process 2.

A drawback of the foregoing solution lies in that if the value of delta corresponding to any semi-persistent scheduling in the multi-periodicity mode is 5 ms in the case of TDD Configuration 2, T1 is as follows.

T1=SPS periodicity+delta=20+5=25 ms

Figure 5:
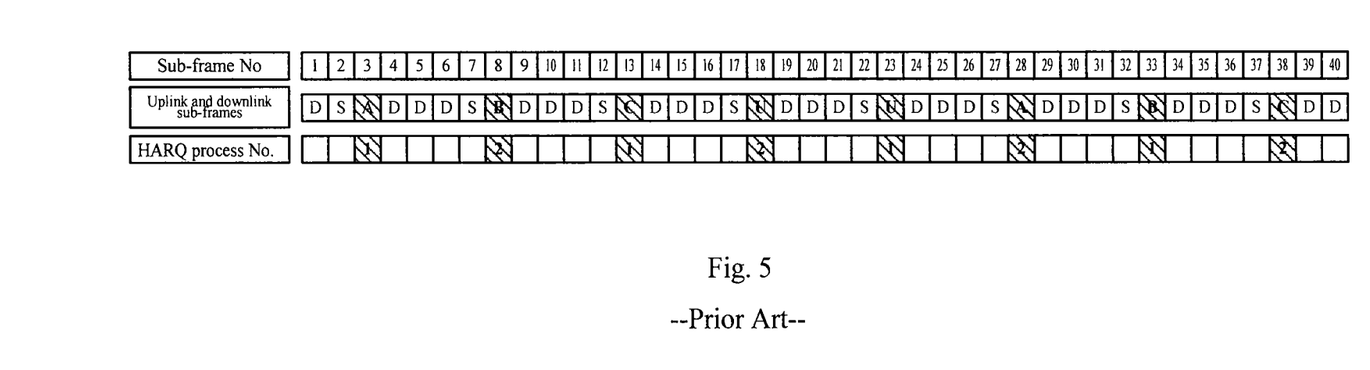
FIG. 5 illustrates a schematic diagram of uplink data resources allocated for different UEs in the case of TDD Configuration 2 in the prior art.

For this configuration, there are eight uplink sub-frames in a 40 ms frame, only six of which are available to semi-persistent scheduling in the multi-periodicity mode. As illustrated in FIG. 5, in a 40 ms frame, resources corresponding to the uplink sub-frames 3 and 28 are allocated from semi-persistent scheduling in the multi-periodicity mode of a UE A (that is, the uplink sub-frames 3 and 28 are occupied respectively by two uplink HARQ processes of the UE A), likewise, resources corresponding to the uplink sub-frames 8 and 33 are allocated from semi-persistent scheduling in the multi-periodicity mode of a UE B, and resources corresponding to the uplink sub-frames 13 and 38 are allocated from semi-persistent scheduling in the multi-periodicity mode of a UE C. As can be apparent, the uplink sub-frames 18 and 23 are unavailable to semi-persistent scheduling in the multi-periodicity mode and consequently the resources are underused. If the uplink sub-frames 18 and 23 are used for semi-persistent scheduling in the multi-periodicity mode, the resources of these two uplink sub-frames have to be scheduled dynamically for transmission of a newly transmitted packet of user data, thus resulting in an excessive overhead of scheduling, which may cause an excessive restriction on uplink transmission and degrade the performance of a system. Likewise, the forgoing problem may also exist if the value of delta corresponding to any semi-persistent scheduling in the multi-periodicity mode is −5 ms.

SUMMARY OF THE INVENTION

Embodiments of the invention provide a method for scheduling uplink data of a user and a user equipment, which are applicable to semi-persistent scheduling in the multi-periodicity mode in the case of 3GPP LTE TDD Configuration 2, to address the problem in the prior art of lower resource utilization ratio of the semi-persistent scheduling in the multi-periodicity mode and reduce the overhead of a system due to dynamic scheduling for improving the resource utilization ratio.

A method for scheduling uplink data of a user according to an embodiment of the invention includes:

setting different values of periodicity offsets, delta, for semi-persistent scheduling in the multi-periodicity mode starting with respective uplink sub-frames in a radio frame;

determining, from the set values of delta, periodicities of semi-persistent scheduling in the multi-periodicity mode starting with the respective uplink sub-frames in the radio frame; and scheduling uplink new transmission of a user data packet in the periodicities of semi-persistent scheduling in the multi-periodicity mode starting with the respective uplink sub-frames in the radio frame.

A user equipment according to an embodiment of the invention includes:

a periodicity offset setting module configured to set different values of periodicity offsets, delta, for semi-persistent scheduling in the multi-periodicity mode starting with respective uplink sub-frames in a radio frame;

a periodicity setting module configured to determine, from the set values of delta, periodicities of semi-persistent scheduling in the multi-periodicity mode starting with the respective uplink sub-frames in the radio frame; and a scheduling module configured to schedule uplink new transmission of a user data packet in the periodicities of semi-persistent scheduling in the multi-periodicity mode starting with the respective uplink sub-frames in the radio frame.

In the foregoing embodiments of the invention, different values of periodicity offsets, delta, are set for semi-persistent scheduling in the multi-periodicity mode starting with respective uplink sub-frames in a radio frame, and periodicities of semi-persistent scheduling in the multi-periodicity mode starting with the respective sub-frames in the radio frame are determined from the set values of delta, so that the respective uplink sub-frames are available to semi-persistent scheduling in the multi-periodicity mode, thereby overcoming the defect in the prior art that there are a part of uplink resources unavailable to semi-persistent scheduling in the multi-periodicity mode and obviating an extra overhead and complexity due to dynamic scheduling adopted to improve the ratio of utilizing these uplink resources unavailable to semi-persistent scheduling in the multi-periodicity mode in the prior art, thus improving the resource utilization ratio and being easy and feasible.

DETAILED DESCRIPTION OF THE EMBODIMENTS

In view of the foregoing drawback in the prior art, embodiments of the invention provide a method for scheduling user data and a user equipment, which are applicable to semi-persistent scheduling in the multi-periodicity mode in the case of 3GPP LTE TDD Configuration 2, to address the problem in the prior art of lower resource utilization ratio of semi-persistent scheduling in the multi-periodicity mode. A general implementation principle and specific implementations of the embodiments of the invention as well as corresponding advantageous effects thereof are set forth in detail hereinafter with reference to the drawings.

In the embodiments of the invention, the configuration of the existing TD-LTE semi-persistent scheduling in the multi-periodicity mode is improved, that is, for TDD Configuration 2, a UE sets different values of delta for semi-persistent scheduling in the multi-periodicity mode starting with different uplink sub-frames in a radio frame, determines periodicities of semi-persistent scheduling in the multi-periodicity mode starting with the different uplink sub-frames in the radio frame according to the set values of delta (the periodicities of semi-persistent scheduling in the multi-periodicity mode may be determined with reference to Equations (1) and (2)) and schedules a newly transmitted packet of user data according to the periodicities of semi-persistent scheduling in the multi-periodicity mode starting with the respective uplink sub-frames.

The values of delta may be specified according to TD-LTE uplink and downlink sub-frame configurations and the locations of the uplink sub-frames scheduled by a PDCCH, possibly in the following two approaches.

A First Approach

For a first uplink sub-frame in a 10 ms TDD periodicity (i.e., an RRT periodicity or a radio frame), the value of delta may be set in the following equation:

$$\text{Delta}=1+\text{number of DL sub-frames}/2 \quad (5)$$

For a second (and also the last) uplink sub-frame in the 10 ms TDD periodicity, the value of delta may be set in the following equation:

$$\text{Delta}=-1-\text{number of DL sub-frames}/2 \quad (6)$$

A Second Approach

For a first uplink sub-frame in a 10 ms TDD periodicity, the value of delta may be set in the following equation:

$$\text{Delta}=-1-\text{number of DL sub-frames}/2 \quad (7)$$

For a second (and also the last) uplink sub-frame in the 10 ms TDD periodicity, the value of delta may be set in the following equation:

$$\text{Delta}=1+\text{number of DL sub-frames}/2 \quad (8)$$

For a VoIP service in the case of TDD Configuration 2, there are eight DL sub-frames (where a special sub-frame is regarded as a downlink sub-frame) and two uplink sub-frames in a 10 ms TDD periodicity, and then the following values of delta may be derived in the foregoing delta calculation equations: the value of delta corresponding to semi-persistent scheduling in the multi-periodicity mode starting with the first uplink sub-frame is 5 ms and the value of delta corresponding to semi-persistent scheduling in the multi-periodicity mode starting with the second uplink sub-frame is −5 ms; or the value of delta corresponding to semi-persistent scheduling in the multi-periodicity mode starting with the first uplink sub-frame is −5 ms and the value of delta corresponding to semi-persistent scheduling in the multi-periodicity mode starting with the second uplink sub-frame is 5 ms.

A process of scheduling an uplink newly transmitted packet by a UE according to the foregoing configuration for the semi-persistent scheduling in the multi-periodicity mode is described below by taking a VoIP service in the case of TDD Configuration 2 as an example.

Figure 6:
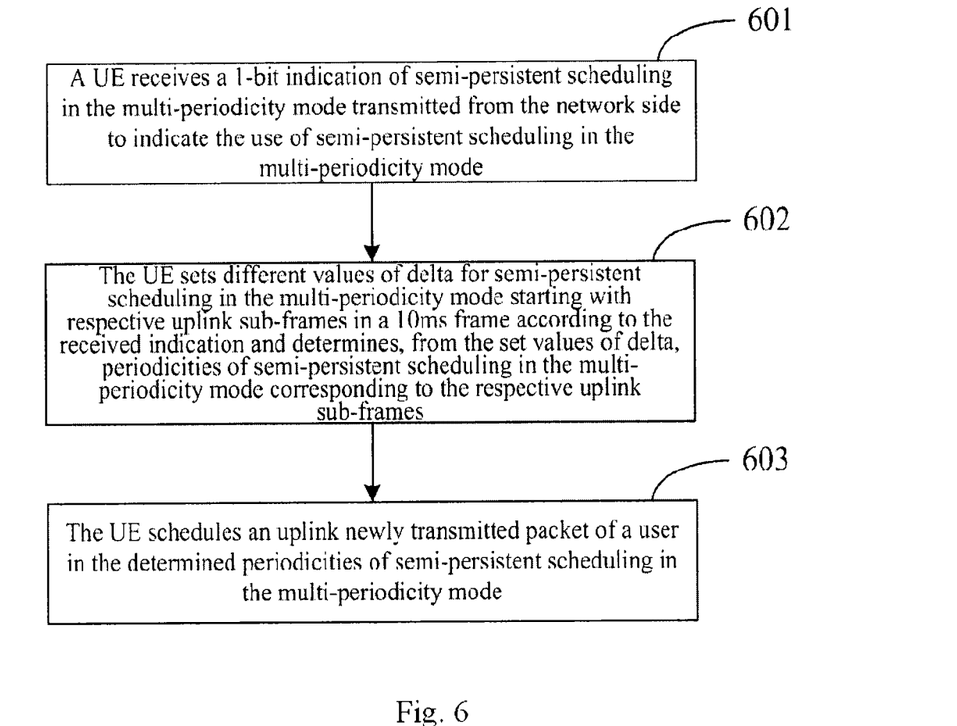
FIG. 6 illustrates a schematic diagram of a flow for scheduling uplink data resources by a UE in the case of TDD Configuration 2 according to an embodiment of the invention.

Referring to FIG. 6, which illustrates a schematic flow chart of scheduling uplink data by a UE in the case of TDD Configuration 2 according to an embodiment of the invention.

In a process 601, a UE receives an indication of semi-persistent scheduling in the multi-periodicity mode transmitted from the network side.

In this process, the UE is triggered from the network side (typically a base station) through RRC signaling to use semi-persistent scheduling in the multi-periodicity mode, and the RRC signaling includes 1-bit indication information to indicate the UE whether to use the semi-persistent scheduling in the multi-periodicity mode. For example, 0 represents the UE shall use the semi-persistent scheduling in the multi-periodicity mode, and 1 represents the UE shall not use the semi-persistent scheduling in the multi-periodicity mode.

In a process 602, the UE sets different values of delta for semi-persistent scheduling in the multi-periodicity mode starting with respective uplink sub-frames in a 10 ms radio frame according to the received indication and determines, from the set values of delta, periodicities of semi-persistent scheduling in the multi-periodicity mode corresponding to the respective uplink sub-frames in the 10 ms radio frame.

In this process, the value of delta set for semi-persistent scheduling in the multi-periodicity mode starting with the first uplink sub-frame in the 10 ms radio frame is 5 ms and the value of delta set for semi-persistent scheduling in the multi-periodicity mode starting with the second uplink sub-frame in the 10 ms radio frame is −5 ms according to Equations (5) and (6), and then periodicities $T1$ and $T2$ of semi-persistent scheduling in the multi-periodicity mode starting with the two uplink sub-frames in the 10 ms radio frame are derived respectively from Equations (1) and (2), where:

the periodicities $T1$ and $T2$ of semi-persistent scheduling in the multi-periodicity mode starting with the first uplink sub-frame in the 10 ms radio frame are:

$T1$=SPS periodicity+delta=20 ms+5 ms=25 ms $T2$=SPS periodicity−delta=20 ms−5 ms=15 ms the periodicities $T1$ and $T2$ of semi-persistent scheduling in the multi-periodicity mode starting with the second uplink sub-frame in the 10 ms radio frame are:

$T1$=SPS periodicity+delta=20 ms−5 ms=15 ms $T2$=SPS periodicity−delta=20 ms+5 ms=25 ms In a process 603, the UE schedules an uplink newly transmitted packet in the determined periodicities of semi-persistent scheduling in the multi-periodicity mode.

In this process, newly transmitted packets are transmitted in alternatively active $T1$ and $T2$ (i.e., 25 ms and 15 ms) from a UE allocated by the semi-persistent scheduling PDCCH to start transmission of data from the first uplink sub-frame in the 10 ms radio frame, and newly transmitted packets are transmitted in alternatively active $T1$ and $T2$ (i.e., 15 ms and 25 ms) from a UE allocated by the semi-persistent scheduling PDCCH to start transmission of data from the second uplink sub-frame in the 10 ms radio frame.

Figure 7:
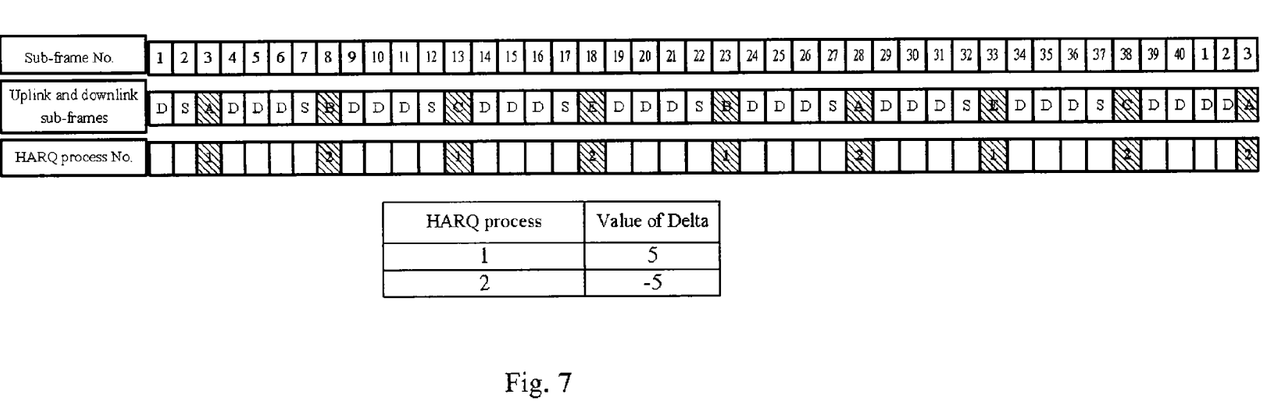
FIG. 7 illustrates a schematic diagram of uplink data resources allocated for different UEs in the case of TDD Configuration 2 according to an embodiment of the invention.

FIG. 7 illustrates a schematic diagram of allocating resources to uplink newly transmitted packets according to the foregoing flow according to the embodiment of the invention when a VoIP service is performed in the case of TDD Configuration 2. As illustrated, in a 40 ms frame, resources corresponding to the uplink sub-frames 3 and 28 are allocated from semi-persistent scheduling in the multi-periodicity mode of a UE A (that is, the uplink sub-frames 3 and 28 are occupied respectively by two uplink newly transmitted packet processes of the UE A), likewise, resources corresponding to the uplink sub-frames 8 and 23 are allocated from semi-persistent scheduling in the multi-periodicity mode of a UE B, resources corresponding to the uplink sub-frames 13 and 38 are allocated from semi-persistent scheduling in the multi-periodicity mode of a UE C, and resources corresponding to the uplink sub-frames 18 and 33 are allocated from semi-persistent scheduling in the multi-periodicity mode of a UE E. As can be apparent, all of the eight uplink sub-frames in the 40 ms frame are available to semi-persistent scheduling in the multi-periodicity mode, thereby overcoming the defect in the prior art that there are always 25% of uplink resources unavailable to semi-persistent scheduling in the multi-periodicity mode, improving the resource utilization ratio and reducing the extra overhead due to dynamic scheduling adopted to improve the ratio of utilizing these uplink resources unavailable to semi-persistent scheduling in the multi-periodicity mode in the prior art.

Based upon the same technical idea as the flow of FIG. 6, an embodiment of the invention further provides a user equipment applicable to semi-persistent scheduling in the multi-periodicity mode in the case of TDD Configuration 2.

Figure 8:
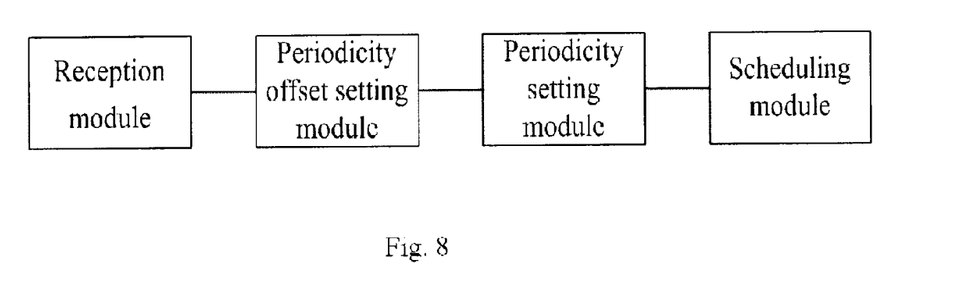
FIG. 8 illustrates a schematic diagram of a structure of a UE according to an embodiment of the invention.

Referring to FIG. 8, which illustrates a schematic diagram of a structure of the UE according to the embodiment of the invention, the UE includes a periodicity offset setting module, a periodicity setting module and a scheduling module.

The periodicity offset setting module is configured to set different values of delta for semi-persistent scheduling in the multi-periodicity mode starting with respective uplink sub-frames in a radio frame (typically a 10 ms radio frame).

The periodicity setting module is configured to determine, from the set values of delta, periodicities of semi-persistent scheduling in the multi-periodicity mode starting with the respective uplink sub-frames in the 10 ms radio frame.

The scheduling module is configured to schedule newly transmitted packets of user data in the periodicities of semi-persistent scheduling in the multi-periodicity mode starting with the respective uplink sub-frames in the 10 ms radio frame.

The periodicity offset setting module may set the values of delta according to the ratio of uplink to downlink sub-frames and the locations of the uplink sub-frames scheduled by a PDCCH, particularly as described above, and a repeated description thereof is omitted here.

The user equipment may further include a reception module configured to receive a 1-bit indication of semi-persistent scheduling in the multi-periodicity mode transmitted from the network side (typically a base station) to indicate the use of semi-persistent scheduling in the multi-periodicity mode, thereby triggering the periodicity offset setting module to set the values of delta as described above.

The above description is presented by taking a VoIP service as an example, but the invention is not limited thereto, and uplink newly transmitted packets of a user performing other types of services may also be scheduled with reference to the foregoing solution.

It will be appreciated that one skilled in the art may make various modifications and alterations to the present invention without departing from the scope of the present invention. Accordingly, if these modifications and alterations to the present invention fall within the scope of the claims of the present invention and their equivalents, the present invention intends to include all these modifications and alterations.

The invention claimed is:

1. A method for scheduling uplink data of a user, applicable to semi-persistent scheduling in a multi-periodicity mode in the case of a third proportional configuration mode of uplink and downlink sub-frames, TDD Configuration 2, in a 3GPP Long Term Evolution Time Division Duplex system, comprising:
   determining, by a processor, periodicities of semi-persistent scheduling in the multi-periodicity mode starting with respective uplink sub-frames in a 10 ms radio frame; and
   scheduling, by the processor, uplink new transmission of a user data packet in the periodicities of semi-persistent scheduling in the multi-periodicity mode starting with the respective uplink sub-frames in the 10 ms radio frame, wherein the periodicities are determined from different values of periodicity offsets, delta, for semi-persistent scheduling in the multi-periodicity mode starting with the respective uplink sub-frames in the 10 ms radio frame, and wherein the different values of delta are set for semi-persistent scheduling in the multi-periodicity mode starting with the respective uplink sub-frames in the 10 ms radio frame according to a ratio of uplink to downlink sub-frames and locations of the uplink sub-frames scheduled by a Physical Downlink Control Channel, PDCCH which comprises:
the value of delta for semi-persistent scheduling in the multi-periodicity mode starting with the first uplink sub-frame in the 10 ms radio frame scheduled by the PDCCH is set as:
Delta=1+number of DL sub-frames/2; and
the value of delta for semi-persistent scheduling in the multi-periodicity mode starting with the second uplink sub-frame in the 10 ms radio frame scheduled by the PDCCH is set as:
Delta=−1−number of DL sub-frames/2;
or
wherein the different values of delta are set for semi-persistent scheduling in the multi-periodicity mode starting with the respective uplink sub-frames in the 10 ms radio frame according to a ratio of uplink to downlink sub-frames and locations of the uplink sub-frames scheduled by a PDCCH comprises:
the value of delta for semi-persistent scheduling in the multi-periodicity mode starting with the first uplink sub-frame in the 10 ms radio frame scheduled by the PDCCH is set as:
Delta=−1−number of DL sub-frames/2; and
the value of delta for semi-persistent scheduling in the multi-periodicity mode starting with the second uplink sub-frame in the 10 ms radio frame scheduled by PDCCH is set as:
Delta=1+number of DL sub-frames/2;
wherein the number of DL sub-frames is the number of sub-frames available to transmit downlink data in the 10 ms radio frame.

2. The method of claim 1, further comprising:
receiving an indication of semi-persistent scheduling in the multi-periodicity mode before the different values of delta are set for semi-persistent scheduling in the multi-periodicity mode starting with the respective uplink sub-frames in the 10 ms radio frame;
wherein when the received indication indicates to adopt semi-persistent scheduling in the multi-periodicity mode, the different values of delta are set for semi-persistent scheduling in the multi-periodicity mode starting with the respective uplink sub-frames in the 10 ms radio frame.

3. The method of claim 2, wherein the indication of semi-persistent scheduling in the multi-periodicity mode is carried in 1-bit information.

4. The method of claim 1, wherein there are eight sub-frames available to transmit downlink data in the 10 ms radio frame in the case of 3GPP Long Term Evolution TDD Configuration 2, and then:
the different values of delta are set for semi-persistent scheduling in the multi-periodicity mode starting with the respective uplink sub-frames in the 10 ms radio frame according to the ratio of uplink to downlink sub-frames and the locations of the uplink sub-frames scheduled by the PDCCH comprises:

the value of delta for semi-persistent scheduling in the multi-periodicity mode starting with the first uplink sub-frame in the 10 ms radio frame scheduled by the PDCCH is set as 5 ms; and the value of delta for semi-persistent scheduling in the multi-periodicity mode starting with the second uplink sub-frame in the 10 ms radio frame scheduled by the PDCCH is set as −5 ms;

or the different values of delta are set for semi-persistent scheduling in the multi-periodicity mode starting with the respective uplink sub-frames in the 10 ms radio frame according to the ratio of uplink to downlink sub-frames and the locations of the uplink sub-frames scheduled by the PDCCH comprises:

setting the value of delta for semi-persistent scheduling in the multi-periodicity mode starting with the first uplink sub-frame in the 10 ms radio frame scheduled by the PDCCH is set as −5 ms; and the value of delta for semi-persistent scheduling in the multi-periodicity mode starting with the second uplink sub-frame in the 10 ms radio frame scheduled by the PDCCH is set as 5 ms.

5. The method of claim 1, wherein the different values of delta are set for semi-persistent scheduling in the multi-periodicity mode starting with the respective uplink sub-frames in the 10 ms radio frame comprises:

the value of delta for semi-persistent scheduling in the multi-periodicity mode starting with the first uplink sub-frame in the 10 ms radio frame is set as 5 ms; and the value of delta for semi-persistent scheduling in the multi-periodicity mode starting with the second uplink sub-frame in the 10 ms radio frame is set as −5 ms;

or the value of delta for semi-persistent scheduling in the multi-periodicity mode starting with the first uplink sub-frame in the 10 ms radio frame is set as −5 ms; and the value of delta for semi-persistent scheduling in the multi-periodicity mode starting with the second uplink sub-frame in the 10 ms radio frame is set as 5 ms.

6. A storage device that stores program code for scheduling uplink data of a user, applicable to semi-persistent scheduling in a multi-periodicity mode in the case of 3GPP Long Term Evolution TDD Configuration 2, wherein the program code is executable by a user equipment to implement:

a periodicity offset setting module configured to set different values of periodicity offsets, delta, for semi-persistent scheduling in the multi-periodicity mode starting with respective uplink sub-frames in a 10 ms radio frame, wherein the periodicity offset setting module sets the different values of delta for semi-persistent scheduling in the multi-periodicity mode starting with the respective uplink sub-frames in the 10 ms radio frame according to a ratio of uplink to downlink sub-frames and locations of the uplink sub-frames scheduled by a PDCCH;

a periodicity setting module configured to determine, from the different values of delta, periodicities of semi-persistent scheduling in the multi-periodicity mode starting with the respective uplink sub-frames in the 10 ms radio frame; and a scheduling module configured to schedule uplink new transmission of a user data packet in the periodicities of semi-persistent scheduling in the multi-periodicity mode starting with the respective uplink sub-frames in the 10 ms radio frame;

wherein the periodicity offset setting module sets the value of delta for semi-persistent scheduling in the multi-periodicity mode starting with the first uplink sub-frame in the 10 ms radio frame scheduled by the PDCCH as:

Delta=1+number of DL sub-frames/2; and sets the value of delta for semi-persistent scheduling in the multi-periodicity mode starting with the second uplink sub-frame in the 10 ms radio frame scheduled by the PDCCH as:

Delta=−1−number of DL sub-frames/2;

or wherein the periodicity offset setting module sets the value of delta for semi-persistent scheduling in the multi-periodicity mode starting with the first uplink sub-frame in the 10 ms radio frame scheduled by the PDCCH as:

Delta=−1−number of DL sub-frames/2; and sets the value of delta for semi-persistent scheduling in the multi-periodicity mode starting with the second uplink sub-frame in the 10 ms radio frame scheduled by the PDCCH as:

Delta=1+number of DL sub-frames/2;

wherein the number of DL sub-frames is the number of sub-frames available to transmit downlink data in the 10 ms radio frame.

7. The storage device of claim 6, further comprising a reception module configured to receive an indication of semi-persistent scheduling in the multi-periodicity mode;

wherein the periodicity offset setting module is triggered to set the different values of delta for semi-persistent scheduling in the multi-periodicity mode starting with the respective uplink sub-frames in the 10 ms radio frame when the indication received by the reception module indicates the user equipment to use semi-persistent scheduling in the multi-periodicity mode.

8. The storage device The user equipment of claim 6, wherein the periodicity offset setting module sets the value of delta for semi-persistent scheduling in the multi-periodicity mode starting with the first uplink sub-frame in the 10 ms radio frame scheduled by the PDCCH as 5 ms and sets the value of delta for semi-persistent scheduling in the multi-periodicity mode starting with the second uplink sub-frame in the 10 ms radio frame scheduled by the PDCCH as −5 ms; or the periodicity offset setting module sets the value of delta for semi-persistent scheduling in the multi-periodicity mode starting with the first uplink sub-frame in the 10 ms radio frame scheduled by the PDCCH as −5 ms and sets the value of delta for semi-persistent scheduling in the multi-periodicity mode starting with the second uplink sub-frame in the 10 ms radio frame scheduled by the PDCCH as 5 ms.

9. The storage device of claim 6, wherein the periodicity offset setting module sets the value of delta for semi-persistent scheduling in the multi-periodicity mode starting with the first uplink sub-frame in the 10 ms radio frame as 5 ms and sets the value of delta for semi-persistent scheduling in the multi-periodicity mode starting with the second uplink sub-frame in the 10 ms radio frame as −5 ms;

or the periodicity offset setting module sets the value of delta for semi-persistent scheduling in the multi-periodicity mode starting with the first uplink sub-frame in the 10 ms radio frame as −5 ms and sets the value of delta for semi-persistent scheduling in the multi-periodicity mode starting with the second uplink sub-frame in the 10 ms radio frame as 5 ms.

* * * * *